United States Patent
Matsumoto (10) Patent No.: US 7,819,572 B2
(45) Date of Patent: Oct. 26, 2010

(54) PLANAR LIGHT SOURCE DEVICE AND DISPLAY DEVICE

(75) Inventor: Shigeyuki Matsumoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 303 days.

(21) Appl. No.: 11/968,955

(22) Filed: Jan. 3, 2008

(65) Prior Publication Data

US 2008/0198627 A1 Aug. 21, 2008

(30) Foreign Application Priority Data

Feb. 20, 2007 (JP) .............................. 2007-039422

(51) Int. Cl.
*F21V 7/04* (2006.01)
*F21V 17/00* (2006.01)
*G02B 6/36* (2006.01)

(52) U.S. Cl. ...................................... 362/633; 362/628

(58) Field of Classification Search ................ 362/633, 362/632, 628, 634; 349/58, 62, 65
See application file for complete search history.

(56) References Cited

U.S. PATENT DOCUMENTS 6,950,154 B2 * 9/2005 Lee .............................. 349/58
7,121,710 B2 * 10/2006 Kim et al. .................... 362/632
7,172,329 B2 * 2/2007 Kao et al. .................... 362/633
7,594,746 B2 * 9/2009 Shin et al. .................... 362/633

FOREIGN PATENT DOCUMENTS

| JP | 9-152577 | 6/1997 |
| JP | 2001-273807 | 10/2001 |
| JP | 2003-162232 | 6/2003 |
| JP | 2005-315957 | 11/2005 |

* cited by examiner

*Primary Examiner*—Alan Cariaso
(74) *Attorney, Agent, or Firm*—Oblon, Spivak, McClelland, Maier & Neustadt, L.L.P.

(57) ABSTRACT

A planar light source device includes a light guide plate, a lamp unit and emitting light to a side surface of the light guide plate, a rear frame for storing the light guide plate and the lamp unit and a mold frame in frame shape disposed between the light guide plate and the rear frame for fitting with the light guide plate provided with a positioning part. In the positioning part, the light guide plate has a surface almost parallel to a side surface provided with the positioning part and a connection surface for connecting the parallel surface with the side surface provided with the positioning part. The rear frame supports the light guide plate with the mold frame interposed therebetween, and includes a projecting part projected inside and formed of an end edge surface and a side edge surface, the end edge surface being disposed to oppose the side surface provided with the positioning part of the light guide plate and the side edge surface being disposed to oppose the connection surface.

19 Claims, 5 Drawing Sheets

PLANAR LIGHT SOURCE DEVICE AND DISPLAY DEVICE

BACKGROUND OF THE INVENTION

1. Field of the Invention

The present invention relates to a planar light source device and a display device using the same, and particularly to a planar light source device having a light guide plate and a display device using the same.

2. Description of Related Art

Some liquid crystal displays use sidelight type (edge light type) planar light source device as a backlight device (backlight unit). In a sidelight type planar light source device, light from a light source enters the side of a light guide plate. Then, the light guide plate emits the light from the light source to the front.

Such sidelight type planar light source device is disclosed (Japanese Unexamined Patent Application Publication Nos. 2001-273807, 2003-162232). In the backlight device disclosed in Japanese Unexamined Patent Application Publication No. 2001-273807, one edge surface of the case to store the light guide plate is bent to form nails. Then, the light guide plate positions the light source unit by these nails.

However, the configuration disclosed in Japanese Unexamined Patent Application Publication No. 2001-273807 does not have enough strength as the light guide plate is supported and fixed only by a case. Accordingly, there is a possibility that the positioned part of the light guide plate may be damaged. In order to realize a planar light source device having a large-sized screen with high luminance especially, it is necessary to increase the number of light sources. Thus the light guide plate must increase its thickness along with that. The thicker the light guide plate, the heavier it becomes. A drop impact causes the light guide plate to be damaged at the positioned part due to the lack of strength in the supporting portion for supporting and fixing the thick light guide plate. When the light guide plate is damaged, there may be luminance unevenness generated in the periphery of the damaged part or the luminance may decrease. Therefore, there is a problem that the performance of the planar light source device will deteriorate. Furthermore, if the extent of breakage is large, it will be necessary to exchange parts.

In the backlight device of Japanese Unexamined Patent Application Publication No. 2003-162232, a concave portion for positioning is formed to the side of a light guide plate. This light guide plate is stored in a frame case. A locking piece is formed in the frame case in the position of the concave portion of the light guide plate. A convex portion is formed in a mold frame in the position of the concave portion of the light guide plate. Then, a locking opening in which the locking piece of the frame case is inserted is formed in the convex portion of the mold frame. Then, the locking piece of the frame case and the locking opening are fitted. Furthermore, an almost horseshoe-shaped bank-like frame is fabricated to the frame case. On the other hand, a horseshoe-shaped groove is formed to the frame of the mold frame. Then, the bank-like frame of the frame case enters into the frame of the mold frame.

However, with the configuration of Japanese Unexamined Patent Application Publication No. 2003-162232, the width of the frame will become large. That is, as the groove is formed in the center of the frame, the width of the frame must be expanded. Moreover, the locking piece of the frame case and the locking opening are fitted. For this reason, the light guide plate is visually recognized in the side surface part of the locking piece. Accordingly, there is a possibility that a large foreign matter may come inside the light guide plate and an optical sheet in a backlight unit. That is, due to the gap between the locking part and the bank-like frame, foreign matters come inside the backlight unit from the gap. Therefore, it is not suitable for the dusty environment. When a foreign matter comes in, there may be luminance unevenness generated and the luminance may decrease. Therefore, there is a problem that the performance of the planar light source device will deteriorate.

The present invention is made against the background of the above situations, and aims to provide a planar light source device with narrow frame and high performance and a display device using the same.

SUMMARY OF THE INVENTION

According to an aspect of the present invention, there is provided a planar light source device that includes a light guide plate having a positioning part formed of a concave or a convex portion to a side surface and emitting an entered incident light from a front surface, a light source for emitting light to a side surface of the light guide plate other than the side surface provided with the positioning part, a rear frame disposed to a back surface side of the light guide plate for storing the light guide plate and the light source, and a mold frame in frame shape disposed between the light guide plate and the rear frame for fitting with the light guide plate provided with the positioning part. In the positioning part, the light guide plate includes a parallel surface almost parallel to the side surface provided with the positioning part and connection surfaces for connecting the parallel surface with the side surface provided with the positioning part The rear frame supports the light guide plate with the mold frame interposed therebetween and includes a projecting part projected inside and formed of an end edge surface and a side edge surface, the end edge surface is disposed to oppose the side surface provided with the positioning part of the light guide plate and the side edge surface is disposed to oppose the connection surface.

The present invention provides a planar light source device with a narrow frame and high performance and a display device using the same.

The above and other objects and features and advantages of the present invention will become more fully understood from the detailed description given hereinbelow and the accompanying drawings which are given by way of illustration only, and thus are not to be considered as limiting the present invention.

DESCRIPTION OF THE PREFERRED EMBODIMENTS

An embodiment in which the present invention can be incorporated is described hereinafter. The following explanation describes the embodiment of the present invention and the present invention is not limited to following embodiments. For the clarity of explanation, the description and the drawings hereinafter are appropriately omitted and simplified.

Figure 1:
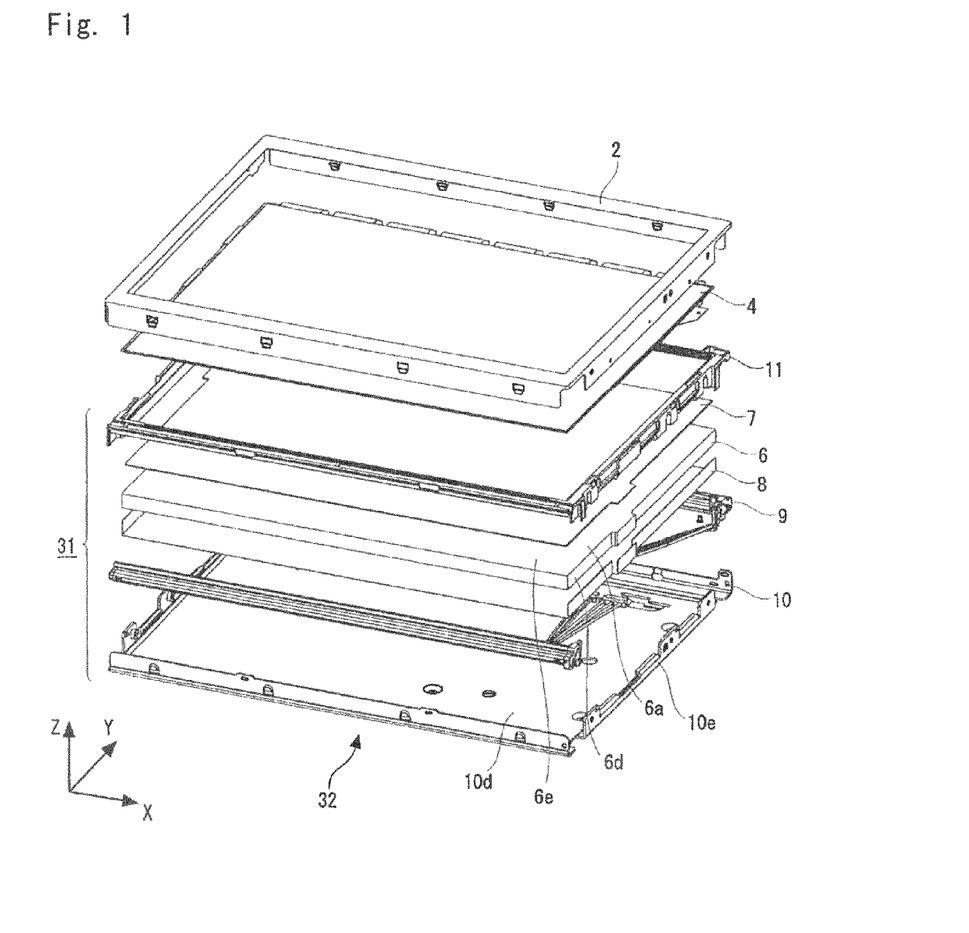
FIG. 1 is an exploded perspective view showing the configuration of a liquid crystal display according to an embodiment of the invention.

With reference to FIG. 1, a display device according to the embodiment of the invention is explained. FIG. 1 is an exploded perspective view showing an example of the configuration of the display device of this embodiment. In this embodiment, the description assumes the display device to be a liquid crystal display. Here, an example is explained using an active-matrix liquid crystal display panel as a liquid crystal display panel 4. Note that as shown in FIG. 1, the thickness direction of a liquid crystal display 32 shall be Z direction and two directions vertical to the Z direction shall be X and Y directions. Accordingly, the X and Y directions are included in the display surface of the liquid crystal display 32 and are parallel to the edge side direction of the liquid crystal display panel 4.

As shown in FIG. 1, the liquid crystal display 32 of this embodiment has a planar light source device 31 disposed to the back of the liquid crystal display panel 4 and a front frame 2 to fix. That is, the liquid crystal display panel 4 is formed inside the front frame 2 with an opening. Then, the planar light source device 31 which irradiates light to the back of the liquid crystal display panel 4 is provided to the back of the liquid crystal display panel 4. This planar light source device 31 is used as a backlight unit.

The planar light source device 31 includes a lamp unit 9, a light guide plate 6, a reflective sheet 8, a rear frame 10, an optical sheet 7 and a mold frame 11. The lamp unit 9 includes a lamp (not shown) which is a line light source. A cold cathode tube can be used as the lamp. The lamp unit 9 has a function for reflecting light emitted from the lamp to the light guide plate 6 side. As the reflection function, for example a reflective sheet (not shown) for reflecting the light in a specular, a diffuse manner or a composite thereof is formed to the inner surface of a lamp reflector. A plastic sheet with a reflectance of 95% or more and a plastic sheet added with high reflection particles such as barium oxide can be used. Moreover, a plastic sheet coated with a highly reflective paint to its surface or a highly reflective metal plate such as aluminum or silver can be used as the reflective sheet. Especially by disposing the plastic sheet with high reflectance of 95% or more to the inner side of the lamp unit 9, the reflectance properties inside will further improve. Therefore, the loss of light can be reduced. Note that as a light source, not only the line light source such as a lamp, aligned LEDs (Light Emitting Diode) which are a plurality of point light sources can be used.

The planar light source device 31 of this embodiment is an edge light type (sidelight type) backlight unit. Accordingly, the lamp included in the lamp unit 9 is disposed to the side of the light guide plate 6. Thus, the light emitted from the lamp unit 9 enters the side of the light guide plate 6. The light guide plate 6 is formed of a transparent plate member in approximately rectangular shape when viewed from the top. Therefore, the light guide plate 6 has a front surface (emission surface 6e), a back surface opposing the front surface and four side surfaces between the front surface and the back surface.

The emission surface 6e and the back surface of the light guide plate 6 are parallel with the XY planar surface. Moreover, the four side surfaces of the light guide plate 6 are parallel with either of the XY planar surface or the YZ planar surface.

The lamp included in the lamp unit 9 is disposed along the side surface (incidence surface) of the light guide plate 6. The incidence surface of the light guide plate 6 is disposed in parallel with the XZ planar surface. The light entered the light guide plate 6 repeats total reflection in the light guide plate 6 and is emitted from the front surface (emission surface 6e). Accordingly, the light guide plate 6 guides the light entered from the side surface thereof to the entire emission surface 6e and emits it from the emission surface 6e. The lamp included in the lamp unit 9 is disposed to the two side surfaces opposing the light guide plate, for example. Here, each lamp is disposed to the side surface of the light guide plate 6 parallel with the XZ planar surface.

The reflective sheet 8 is disposed to the back surface opposing the emission surface 6e of the light guide plate 6. This reflective sheet 8 reflects the light emitted from the side surface and the back surface of the light guide plate 6 and lets the light enter to the light guide plate 6 again. The rear frame 10 is disposed to the back surface of the light guide plate 6. The rear frame 10 stores the light guide plate 6, the reflective sheet 8 and the lamp unit 9 or the like. Therefore, the reflective sheet 8 is disposed over the rear frame 10 and the light guide plate 6 is disposed over the reflective sheet 8. Then, the lamp of the lamp unit 9 and the lamp reflector are arranged between the rear frame 10 and the side surface of the light guide plate 6. Note that instead of the reflective sheet 8, the rear frame 10 may have the light reflection function.

The rear frame 10 is formed from metal member with high rigidity such as aluminum, stainless steel, iron, brass and magnesium alloy. This improves the strength of the support and fixture of the light guide plate 6. The rear frame 10 is a box type case with opened front surface by processing the metal plate formed from the abovementioned material. Therefore, the light of the light guide plate 6 is emitted from the opened front surface of the rear frame 10. The rear frame 10 includes a back part 10d disposed to the back surface side of the light guide plate 6 and side parts 10e disposed to the side surface side of the light guide plate 6. That is, the back part 10d and the side parts 10e are formed by folding the edge part of the metal plate. The back part 10d is disposed in parallel with the XY planar surface. Then, the side parts 10e extend from the edge of the back part 10d in the Z direction. Here, since the side parts 10e are disposed to four edge sides of the back part 10d, the four side parts 10e extend from the edge part of the back part 10d. The height of the side parts 10e in the Z direction is almost the same as the thickness of the light guide plate 6. The size of the back part 10d in the XY direction is almost the same as the size of the light guide plate 6.

The optical sheet 7 is disposed over the emission surface 6e of the light guide plate 6. The optical sheet 7 is formed of one or a plurality of sheets. For example, as the optical sheet 7, a prism sheet (lens sheet), a diffusion sheet, a protective sheet, a prism sheet or a polarizing sheet can be used. Multiple sheets among these are stacked and disposed to the front surface of the light guide plate 6. It is needless to say that the number of the optical sheets 7 may be only one. Moreover, two or more sheets of the same function may be used. For example, if improvement in luminance is required, a plurality of the prism sheets can be combined in consideration of the prism direction formed to the surface thereof. Moreover, two or more diffusion sheets can be used to improve diffusibility. In addition, only one or no prism sheet may be used depending on the light distribution characteristics of the prism sheet. The optical sheet 7 is disposed between the light guide plate 6 and the liquid crystal display panel 4.

The mold frame 11 is disposed to the front surface side of the rear frame 10. The mold frame 11 is formed in frame shape. Accordingly, the mold frame 11 has a rectangular shaped opening. This opening corresponds to the display area. Therefore, the light from the light guide plate 6 enters the liquid crystal display panel 4 through the opening provided to the mold frame 11. As the mold frame 11, a resin mold can be used, for example. As described above, the mold frame 11 is formed in frame shape to surround the periphery of the light guide plate 6. Moreover, the mold frame 11 fits with the rear frame 10. Then, the optical sheet 7, the light guide plate 6, the reflective sheet 8 and the lamp unit 9 are stored in the rear frame 10 to be the planar light source device 31.

The liquid crystal display panel 4 is disposed in front of the abovementioned planar light source device 31. The liquid crystal display panel 4 includes one pair of transparent insulating substrates. One of the pair of transparent insulating substrates is a TFT array substrate (not shown) and the other is an opposing substrate (not shown). The TFT array substrate and the opposing substrate are disposed to oppose. That is, the liquid crystal display panel 4 has the structure in which liquid crystal is held between the two substrates. Gate lines (scanning lines) in horizontal direction and source lines (signal lines) in vertical direction are formed to the TFT array substrate and TFTs are provided near the intersections of the gate and source lines. Furthermore, a plurality of pixel electrodes formed in matrix are included between the gate lines and the source lines. Gates of the TFTs are connected to the gate lines, sources are connected to the source lines and drains are connected to the pixel electrodes, respectively.

The TFT array substrate and the opposing substrate are maintained to have a predetermined gap by a spacer. The TFT array substrate and the opposing substrate are bonded by a seal material disposed to surround the display area. Then, the liquid crystal is filled into the space formed by the TFT array substrate, the opposing substrate and the seal material. The liquid crystal is filled from the liquid crystal inlet provided to the seal material. After filling the liquid crystal between the substrates, the inlet is sealed with an end-sealing material. A polarizing plate is attached to the outer surface of the TFT array substrate and the outer surface of the opposing substrate. Meanwhile, common electrodes and color filters of R (red), G (green) and B (blue) are formed over the opposing substrate. Then, light shielding layers (BM) is formed between the color filters. The common electrodes are actually transparent electrodes formed almost all over the opposing substrate to oppose the pixel electrodes. Moreover, an alignment layer for giving initial alignment to the liquid crystal is formed to the inner surface of the TFT array substrate and the opposing substrate.

Furthermore, the liquid crystal display panel 4 has the display area formed of a plurality of pixels and a peripheral area formed in the surroundings. A source driver and a gate driver are connected to the peripheral area. Typically, the source driver and the gate driver are connected to the array substrate by TAB (Tape Automated Bonding), however they may be provided directly over the array substrate by COG (Chip On Glass).

Here, operations of the liquid crystal display panel 4 is explained. A scanning signal is supplied to each gate line from the gate driver and all the TFTs connected to one gate line selected by each scanning signal are turned on at the same time. Then, a gradation voltage corresponding to a display signal is supplied to each source line from the source driver and charge is accumulated in the pixel electrode. According to a potential difference of the pixel electrode accumulating the charges and the common electrode, the arrangement of the liquid crystal between the pixel electrode and the common electrodes changes. As for the linear polarization which penetrated the polarizing plate by the non-visible side, the polarization direction is controlled by the liquid crystal and the transmittance of the light penetrating the visible side polarizing plate is controlled. Each pixel of the liquid crystal display panel 4 displays various colors by the shades of colors according to the amount of penetrating light and the color display of one of RGB. Note that for monochrome display, it is not necessary to provide the color filters.

As the liquid crystal display panel 4, other than the above TFT type, a simple-matrix type not having switching devices is known. Other than this, following types of liquid crystal display panels are well known, which are; TN (Twisted Nematic) type, STN (Super Twisted Nematic) type and IPS (In Plane Switching) type in which pixel electrodes and common electrodes are formed over the same substrate. The present invention can be incorporated to various types of such liquid crystal display panels.

Then, the liquid crystal display panel 4 disposed over the planar light source device 31 is fixed by the front frame 2. The front frame 2 is formed in frame shape and includes an opening corresponding to the display area. The front frame 2 is disposed to the front surface side of the liquid crystal display panel 4. The liquid crystal display panel 4 is disposed between the rear frame 10 and the front frame 2. Then, the liquid crystal display 32 is completed by fixing the front frame 2 to the rear frame 10. Therefore, the front frame 2 and the rear frame 10 are to be the case to store the liquid crystal display panel 4 etc.

Figure 2:
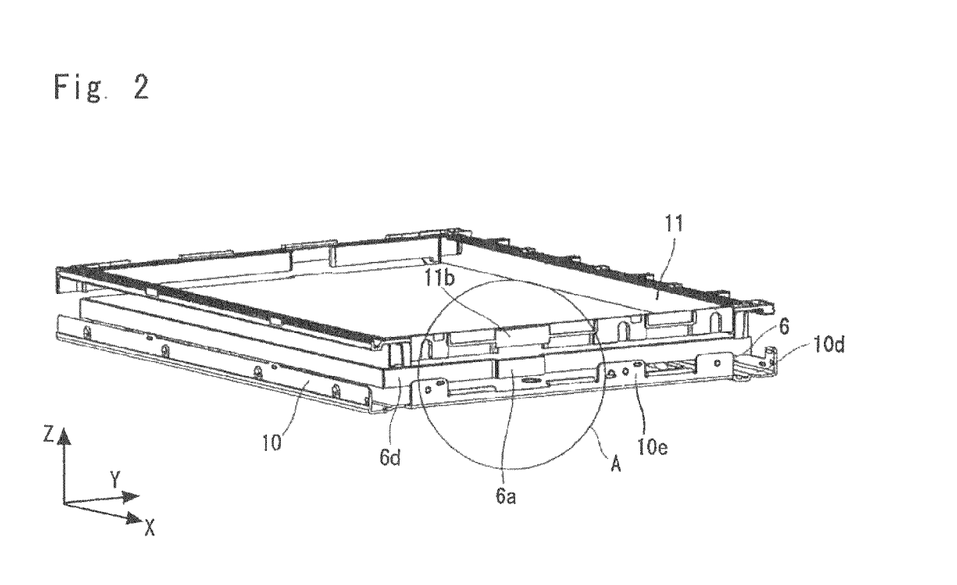
FIG. 2 is an exploded perspective view showing the configuration of a planar light source device according to an embodiment of the invention.
Figure 3:
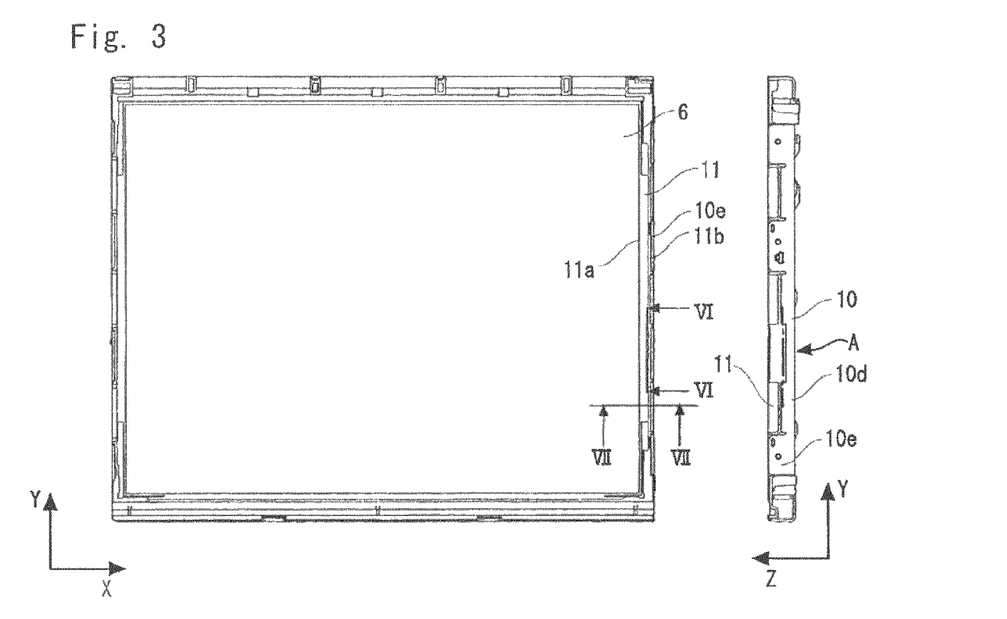
FIG. 3 is a front view and a cross-sectional view showing the configuration of the planar light source device according to an embodiment of the invention.
Figure 4:
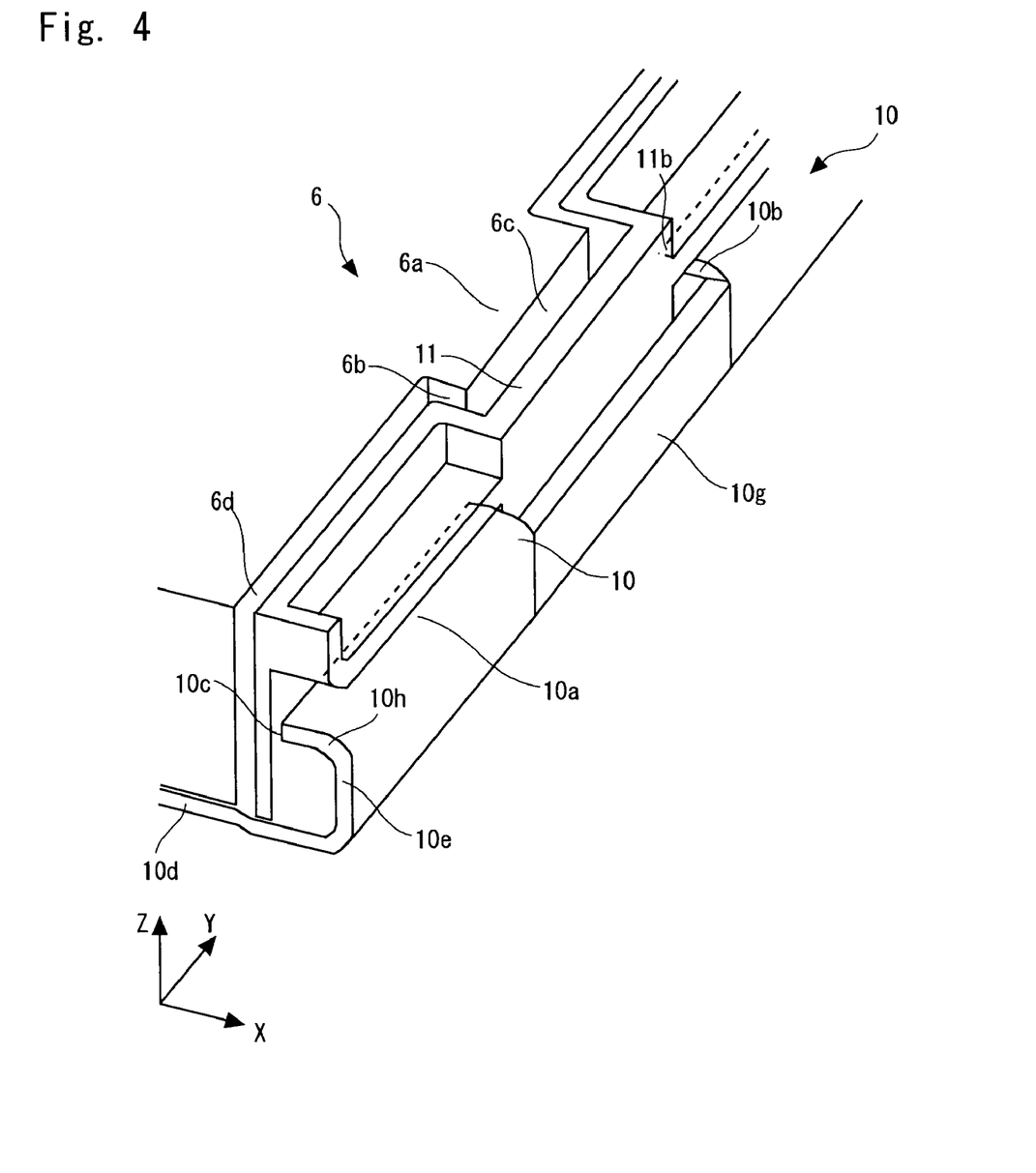
FIG. 4 is a perspective view showing the configuration of a section A of the planar light source device according to an embodiment of the invention.
Figure 5:
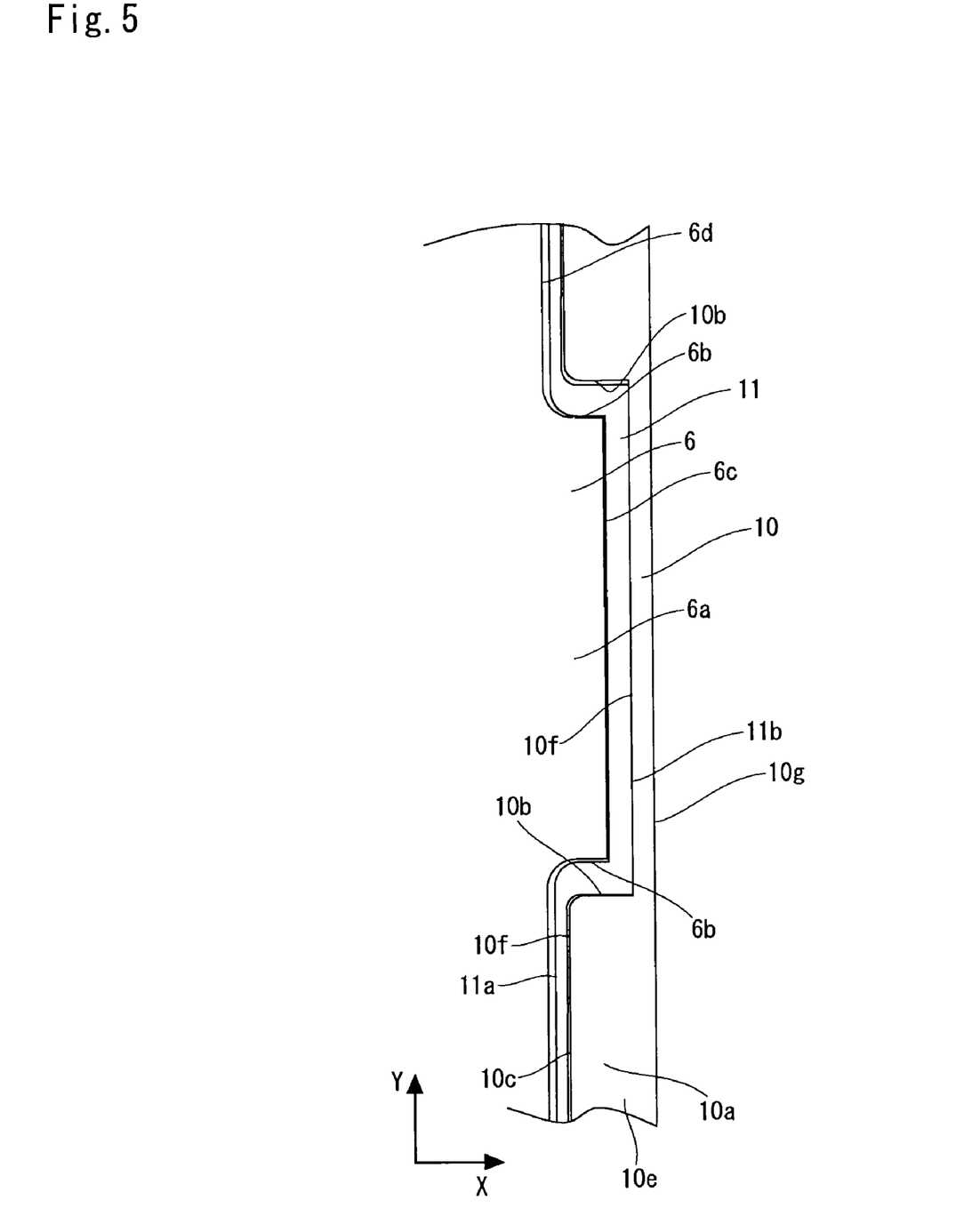
FIG. 5 is a plane view showing the configuration of the section A of the planar light source device according to an embodiment of the invention.
Figure 6:
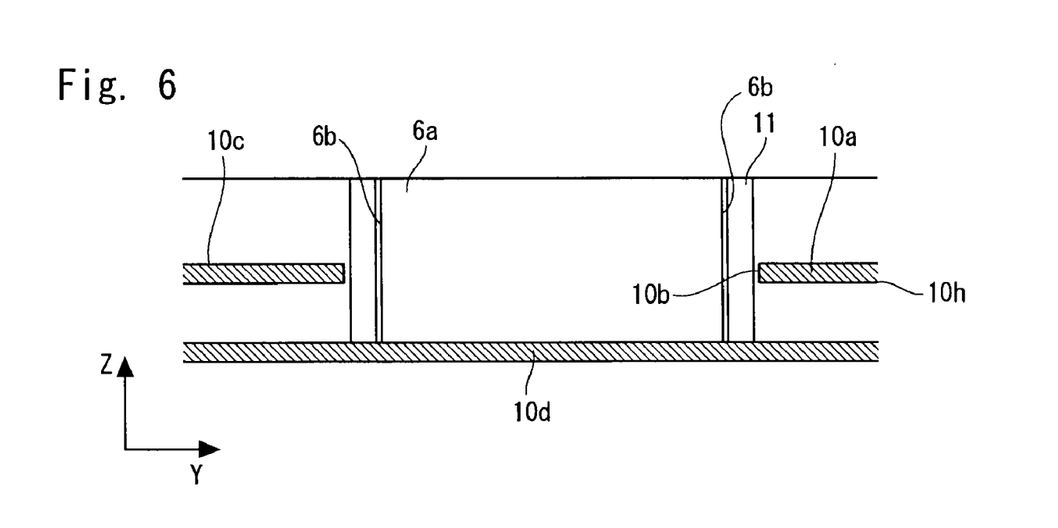
FIG. 6 is a cross-sectional diagram taken along the line VI-VI of FIG. 3.
Figure 7:
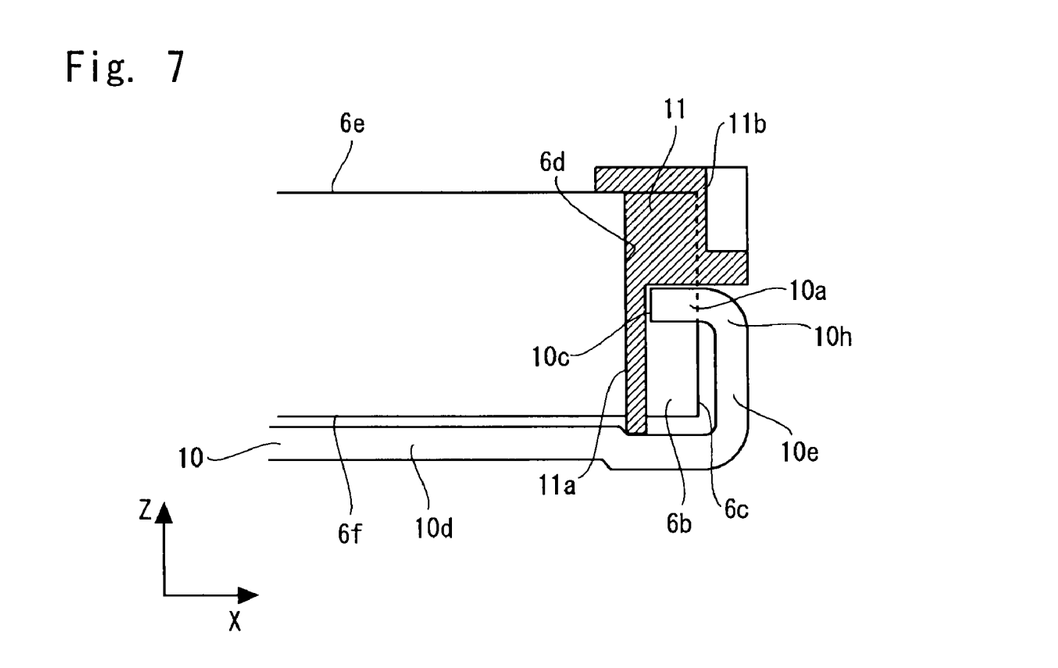
FIG. 7 is a cross-sectional diagram taken along the line VII-VII of FIG. 3.

Next, the configuration of the light guide plate 6, the mold frame 11 and the rear frame 10 is explained with reference to FIGS. 2 to 7. FIG. 2 is an exploded perspective view showing the configuration of the planar light source device 31 and shows the state before the mold frame 11 and the rear frame 10 are fitted. FIG. 3 is a plane view and a side view showing the configuration of the planar light source device 31 and shows the state after the mold frame 11 and the rear frame 10 are fitted. FIG. 4 is a perspective view enlarging the configuration of the section A shown in FIGS. 2 and 3. FIG. 5 is a front view enlarging the configuration of the section A of the planar light source device. FIG. 6 is a cross-sectional diagram taken along the line VI-VI of FIG. 4 and shows the configuration of the YZ surface. FIG. 7 is a cross-sectional diagram taken along the line VII-VII of FIG. 4 and shows the configuration of the XZ surface. Note that in FIGS. 2 to 7, the configuration other than the light guide plate 6, the mold frame 11 and the rear frame 10 is omitted. Therefore, in FIGS. 2 to 7, the configuration of the reflective sheet 8 and the optical sheet 7 etc. is omitted.

As shown in FIGS. 2 and 3, for the light guide plate 6, a positioning part 6a is formed to the side surface 6d where the lamp unit 9 is not formed. That is, the positioning part 6a is provided to the side surface adjacent to the side surface of the light guide plate 6 where the lamp unit 9 is disposed. The positioning part 6a is formed by a convex portion (projected shape) or a concave portion (notch shape) provided to the side surface 6d the light guide plate 6. In this embodiment, the positioning part 6a is formed by the convex portion formed to the side surface 6d. For example, as shown in FIG. 2, in the positioning part 6a, the light guide plate 6 is projected in the +X direction. Therefore, in the light guide plate 6, the side surface 6d is formed step-wise. Moreover, the mold frame 11 is formed with a bend corresponding to the convex portion provided to the side surface 6*d* of the light guide plate 6. That is, a concave portion corresponding to the convex portion is formed in the inner side surface 11*a* of the mold frame 11. Then, the mold frame 11 and the light guide plate 6 are fitted. The light guide plate 6 is positioned by the mold frame 11. Note that the convex portion for positioning is formed also to the reflective sheet 8 and the optical sheet 7 in the positioning part 6*a*. As shown in FIG. 1, the positioning part 6*a* may be formed to the two side surfaces opposing the light guide plate 6. The positioning part 6*a* is formed to the side surface 6*d* where the lamp is not provided. Therefore, the positioning part 6*a* is formed to the side surface 6*d* which is parallel with the YZ planar surface of the light guide plate 6.

Then, the mold frame 11 is disposed inside the rear frame 10. Accordingly, an outer side surface 11*b* of the mold frame 11 and an inner side surface 10*f* of the side part 10*e* of the rear frame 10 oppose. The side part 10*e* of the rear frame 10 regulates the position of the mold frame 11 in the X and the Y directions. In the rear frame 10, the light guide plate 6 which fitted with the mold frame 11 is positioned. As described above, the light guide plate 6 is supported and fixed by the mold frame 11 and the rear frame 10. This improves the supporting strength of the light guide plate 6. Therefore, it is possible to prevent from damaging the light guide plate 6 even by a drop impact. Especially for a large-sized liquid crystal display, the lamp unit 9 and the light guide plate 6 will become thick. The thicker the light guide plate 6, the heavier it becomes. Since the rear frame 10 is supporting the light guide plate 6 with the mold frame 11 interposed therebetween, sufficient strength to support and fix the thick light guide plate 6 can be obtained. Therefore, even by a drop impact, it is possible to prevent from damaging the light guide plate.

In the positioning part 6*a*, as shown in FIG. 5, the light guide plate 6 is projected from the side surface 6*d* in the +X direction. Here in the positioning part 6*a*, the surface almost parallel with the side surface 6*d* shall be a parallel surface 6*c* and the surface connected with the side surface 6*d* shall be a connection surface 6*b*. That is, the connection surfaces 6*b* are disposed to the both sides of the parallel surface 6*c*. The connection surface 6*b* inclines from the side surface 6*d*. Here, the connection surface 6*b* is formed to be almost vertical to the side surface 6*d* and the parallel surface 6*c*. At the both sides of the parallel surface 6*c*, the two connection surfaces 6*b* connect between the parallel surface 6*c* and the side surface 6*d*. That is, one end (end by the side of +X) of the connection surface 6*b* is connected with the parallel surface 6*c* and the other end (end by the side of −X) is connected with the side surface 6*d*. By this connecting surfaces 6*b*, the convex portion projected in the +X direction is formed in the positioning part 6*a*.

The mold frame 11 is disposed to the outside of the light guide plate 6 and regulates the position of the light guide plate 6. Therefore, the mold frame 11 is formed along the side surface 6*d* including the positioning part 6*a* of the light guide plate 6. That is, in the position corresponding to the positioning part 6*a*, the mold frame 11 is bent in an almost horseshoe-shape. Thus, the convex portion of the light guide plate 6 is disposed in the mold frame 11. Then, the mold frame 11 and the light guide plate 6 are fitted. Hence, the inner side surface 11*a* of the mold frame 11 is disposed to oppose the side surface 6*d*, the parallel surface 6*c* and the connection surface 6*b* of the light guide plate. The inner side surface 11*a* of the mold frame 11 is bent corresponding to the shape of the positioning part 6*a*. Moreover, the width of the mold frame 11 in the X direction is almost constant. In other words, the width of the mold frame 11 is almost equal in the position opposing the side surface 6*d* and the position opposing the parallel surface 6*c* of the light guide plate 6. The mold frame 11 is disposed to be in contact or in proximity with the light guide plate 6. The mold frame 11 positions the light guide plate 6. That is, the position of the light guide plate 6 is restricted by the light guide plate 6 being in contact. The mold frame 11 holds the light guide plate 6 in this way.

As shown in FIG. 5, the rear frame 10 is disposed to the outside of the mold frame 11 to regulate the position of the mold frame 11. The rear frame 10 is formed along the mold frame 11. That is, the outer side surface 11*b* of the mold frame 11 and an inner side surface 10*f* of the side part 10*e* of the rear frame 10 are disposed to oppose. Therefore, in the position corresponding to the positioning part 6*a*, the inner side surface 10*f* of the rear frame 10 is depressed in the +X direction. Then, the outer side surface 11*b* of the mold frame 11 is supported by the inner side surface 10*f* of the rear frame 10. The position of the inner side surface 10*f* of the rear frame 10 in the X direction is changing in the position corresponding to the positioning part 6*a* and both outsides of the positioning part 6*a* (the position shifted in the Y direction). That is, in the position corresponding to the positioning part 6*a*, the inner side surface 10*f* of the rear frame 10 is disposed to the +X side, and in both outsides of the positioning part 6*a*, the inner side surface 10*f* of the rear frame 10 is disposed in the −X side. Therefore, the width in the X direction of the rear frame 10 in the positioning part 6*a* is narrower than other parts. Accordingly, the position of an outer side surface 10*g* of the rear frame 10 in the X direction is constant and the position of the inner side surface 10*f* is changing.

Then, as shown in FIGS. 4, 6 and 7, the rear frame 10 includes a projecting part 10*a* projected inside. Thus, the projecting part 10*a* is formed by bending inside the side part 10*e* of the rear frame 10. A bent part 10*h* is provided between the side part 10*e* and the projecting part 10*a*. The bent part 10*h* is formed by bending the metal plate. The projecting part 10*a* is disposed in parallel with the back part 10*d*. Therefore, as shown in FIG. 7, in the XZ cross-section, the side part 10*e* of the rear frame 10 is bent in L-shape. To be more specific, the side part 10*e* is formed by bending the edge part of the back part 10*d* of the rear frame 10 in the +Z direction and the projecting part 10*a* is formed by bending the side part 10*e* in the −X direction. The bent part 10*h* and the projecting part 10*a* are formed by bending works. This enables to manufacture easily. Therefore, component cost can be reduced and productivity can be improved. The projecting part 10*a* is formed along the Y direction except for the position corresponding to the positioning part 6*a*. The projecting part 10*a* is supporting the side surface 6*d* of the light guide plate 6 in which the positioning part 6*a* is provided, through the mold frame 11. Moreover, among the four side parts 10*e*, the projecting part 10*a* is formed only to the two side parts 10*e* where the lamp unit 9 is not provided. The projecting part 10*a* is disposed to be in contact or in proximity with the mold frame 11 except for the position corresponding to the positioning part 6*a*. That is, the outer side surface 11*b* of the mold frame 11 and the projecting part 10*a* are disposed to oppose. The position of the mold frame 11 is regulated by this projecting part 10*a*.

The projecting parts 10*a* are formed to the two side parts 10*e* of the rear frame 10. Then, the projecting parts 10*a* is disposed to the both outsides of the positioning part 6*a* of the light guide plate 6. That is, two projecting parts 10*a* are disposed to sandwich the positioning part 6*a* of the light guide plate 6. The end edge surface 10*c* inside the projecting part 10*a* (the direction of −X) is located in the both outsides of the positioning part 6*a*. An end edge surface 10*c* of the projecting part 10a formed by bending is disposed to YZ planar surface. The end edge surface 10c is disposed to oppose the outer side surface 11b of the mold frame 11. Then, the position of the mold frame 11 in the X direction is regulated. Moreover, the projecting part 10a is not formed to the side part 10e of the rear frame 10 in the positioning part 6a. Therefore, the projecting part 10a is not disposed to oppose the parallel surface 6c of the light guide plate 6. The size of the projecting part 10a in the X direction is almost same as the convex portion of the light guide plate 6. The width of the side part 10e of the rear frame 10 in the X direction is narrow for the size of the convex portion of the light guide plate 6 in the positioning part 6a. This makes the position of the outer side surface 10g of the rear frame 10 in the X direction constant. Therefore, a frame area can be narrowed. That is, the frame area can be almost same size in the positioning part 6a and both outside of the positioning part 6a. This enables to achieve a narrow frame.

Moreover, the surface by the side of the connection surface 6b which extends from the bent part 10h to the end edge surface 10c of the projecting part 10a shall be a side edge surface 10b. This side edge surface 10b is disposed in parallel with the YZ planar surface. Then, the side edge surface 10b is disposed in parallel with the connection surface 6b of the light guide plate 6. Therefore, the side edge surface 10b of the projecting part 10a is formed vertical to the end edge surface 10c. The side edge surface 10b is disposed to oppose the connection surface 6b of the light guide plate 6 with the mold frame 11 interposed therebetween. Accordingly, the position of the mold frame 11 in the Y direction is regulated. Therefore, the side edge surface 10b positions the light guide plate 6 with the mold frame 11 interposed therebetween. As described above, between the two projecting parts 10a, the convex portion provided in the positioning part 6a of the light guide plate 6 and a part of the mold frame 11 are inserted. That is, the two side edge surfaces 10b disposed to the both sides of the positioning part 6a are formed to sandwich the convex portion of the light guide plate 6 and the part of the mold frame 11. The rear frame 10 supports and fixes the light guide plate 6 with the mold frame interposed therebetween in this way.

The position of the mold frame 11 and the position of the light guide plate 6 in the XY direction inside the rear frame 10 are regulated using the rear frame 10 of the above configurations. That is, the projecting parts 10a sandwich the convex portion provided in the positioning part 6a from both sides. This ensures the positioning. Hence, the convex portion is sandwiched from the both sides by the end edge surface 10c of the projecting part 10a. This regulates the position in the +Y direction. This further ensures the positioning. Accordingly, the light guide plate 6 can be certainly positioned by the rear frame 10 and the mold frame 11 with simple configuration. Furthermore, the positioning can be further ensured by forming the positioning part 6a to the opposing two side surfaces 6d of the light guide plate 6 and using the abovementioned mold frame 11 and the rear frame 10.

Moreover, the rear frame 10 supports and fixes the light guide plate 6 with the mold frame 11 interposed therebetween. That is, the mold frame 11 is sandwiched between the light guide plate 6 and the rear frame 10. This improves supporting strength. For example, stress concentration of the portion supporting and fixing the light guide plate 6 can be reduced at the time of drop and shock resistance can be improved. Therefore, it is possible to prevent luminance unevenness and luminance from reducing which are caused by damage. This improves the performance of the planar light source device. Furthermore, in the portion to support and fix, the projecting part 10a can be formed with almost the same size as the size of the positioning part 6a to the side part 10e of the rear frame 10. This enables to achieve a narrow frame.

The side part 10e of the rear frame 10 corresponding to the positioning part 6a and the side parts 10e of the both outsides of the positioning part 6a are integrally formed. Therefore, in the boundary of the positioning part 6a, the rear frame 10 and the mold frame 11 are formed with almost no gap. As shown in the drawings, with the configuration in which the light guide plate 6, the rear frame 10 and the mold frame 11 are disposed with almost no gap and the front frame 2 is covered, foreign matters influencing the display are difficult to enter inside. Therefore, it is possible to prevent from luminance unevenness and luminance from decreasing which are caused by foreign matters. This improves the performance of the planar light source device. Moreover, productivity can be improved. With the above configuration, a planar light source device with a narrow frame and high performance can be achieved. By using such planar light source device 31, uniform light is irradiated to the liquid crystal panel 4. Therefore, the display quality of the liquid crystal display 32 can be improved.

Moreover, as shown in FIG. 7, the end edge surface 10c of the projecting part 10a of the rear frame 10 is formed to locate near the center of the light guide plate 6 in the thickness direction (Z direction). Therefore, the end edge surface 10c is not provided to the emission surface 6e and the back surface 6f of the light guide plate 6. That is, the end edge surface 10c is disposed to oppose the light guide plate 6 in the position including the center of the light guide plate 6 in the thickness direction. This enables to support and fix the light guide plate 6 which is the heaviest in the planar light source device 31 with a good balance. Moreover, the rear frame 10 is formed by bending works. Therefore, the end edge surface 10c of the projecting part 10a can be disposed to the central part of the light guide plate 6 in the thickness direction easily.

Note that the abovementioned embodiment shows the case of forming the positioning part 6a by the convex portion but it is not limited to this. For example, the positioning part 6a can be formed by the concave portion provided to the light guide plate 6. In the case of the concave portion, a part of the mold frame 11 and the projecting part 10a are inserted to the concave portion to be the positioning part 6a. That is, the projecting part 10a is sandwiched by the two connection surfaces 6b provided to the light guide plate 6. Accordingly, both sides of the side edge surfaces 10b for one projecting part 10a are respectively disposed to the connection surfaces 6b. Thus, if the positioning part 6a of the light guide plate 6 is made into a notch (concave portion) shape, the projecting part 10a is inserted in the concave portion. Accordingly, the light guide plate 6 is supported and fixed by the rear frame 10 with the mold frame 11 interposed therebetween. Therefore, the same advantageous effects as above can be obtained. Moreover, by sandwiching the projecting part 10a by the connection surfaces of the convex portion, the position in the Y direction can be regulated. Thus the positioning can be further ensured.

Note that the present invention is not limited to the backlight unit of the liquid crystal display 32 but can be incorporated to the planar light source device 31 of other modes used for lighting. Furthermore, by disposing this device light source device 31 opposed to the display panel, productivity and display quality can be improved. It is needless to say that display panels other than a liquid crystal display panel can be used.

From the invention thus described and it will be obvious that the embodiments of the invention may be varied in many ways. Such variations are not to be regarded as a departure from the spirit and scope of the invention and all such modifications as would be obvious to one skilled in the art are intended for inclusion within the scope of the following claims.

What is claimed is:

1. A planar light source device, comprising:
a light guide plate that emits an entered incident light from a front surface thereof, the light guide plate including a convex positioning part disposed on a side surface thereof;
a light source that emits light to a side surface of the light guide plate other than the side surface including the positioning part;
a rear frame disposed on a back surface side of the light guide plate, the rear frame storing the light guide plate and the light source; and
a mold frame having a frame shape and disposed between the light guide plate and the rear frame, the mold frame fitting with the light guide plate including the positioning part,
wherein the positioning part includes a parallel surface almost parallel to the side surface of the light guide plate including the positioning part and includes connection surfaces that connect the parallel surface to the side surface of the light guide plate including the positioning part,
the rear frame supports the light guide plate with the mold frame interposed therebetween and includes a projecting part projecting to an inside of the rear frame, the projecting part being formed of an end edge surface and a side edge surface, the end edge surface opposing the side surface of the light guide plate and the side edge surface opposing the connection surfaces, and the mold frame includes an opening therethrough and surrounds a periphery of the light guide plate.

2. The planar light source device according to claim 1, wherein in a central part of the light guide plate in a thickness direction, the end edge surface of the projecting part opposes the light guide plate with the mold frame therebetween.

3. The planar light source device according to claim 1, wherein the projecting part is formed on both lateral sides of the positioning part of the light guide plate, and
the side edge surface of the projecting part sandwiches the positioning part.

4. The planar light source device according to claim 1, wherein the projecting part has a L-shape and is a side part of the rear frame bent to the inside of the rear frame.

5. A display device, comprising:
the planar light source device according to claim 1; and
a display panel opposing the planar light source device.

6. The planar light source device according to claim 1, wherein the mold frame only contacts the light guide plate around the periphery of the light guide plate.

7. The planar light source device according to claim 5, wherein the rectangular-shaped opening corresponds to a display area of the display device.

8. The planar light source device according to claim 1, wherein an inner side surface of the mold frame includes a concave portion surrounding the convex positioning part.

9. The planar light source device according to claim 1, wherein the projecting part presses against the mold frame.

10. The planar light source device according to claim 1, wherein the rear frame contacts the back surface side of the light guide plate.

11. The planar light source device according to claim 4, wherein the projecting part forms a side edge of the rear plate bent towards the mold frame.

12. A planar light source device, comprising:
a light guide plate including a positioning part formed of a convex portion on a side surface thereof and emitting an entered incident light from a front surface;
a light source that emits light to a side surface of the light guide plate other than the side surface including the positioning part;
a rear frame disposed on a back surface side of the light guide plate, the rear frame storing the light guide plate and the light source; and
a mold frame having a frame shape and disposed between the light guide plate and the rear frame, the mold frame fitting with the light guide plate including the positioning part,
wherein the positioning part includes a parallel surface almost parallel to the side surface of the light guide plate including the positioning part and includes connection surfaces that connect the parallel surface to the side surface of the light guide plate including the positioning part,
the rear frame supports the light guide plate with the mold frame interposed therebetween and includes a projecting part projecting to an inside of the rear frame, the projecting part being formed of an end edge surface and a side edge surface, the end edge surface opposing the side surface of the light guide plate and the side edge surface opposing the connection surfaces, and
wherein the end edge surface of the projection part faces an outer side of the mold frame except at a position corresponding to the position part of the light guide plate at the positioning part of light guide plate.

13. The planar light source according to claim 12, wherein the mold frame is disposed between the rear frame and the light guide plate at the positioning part.

14. The planar light source device according to claim 12, wherein the end edge surface the projection portion contacts an outer side of the mold frame to regulate a position of the mold frame.

15. The planar light source device according to claim 12, wherein the light guide plate is stored in the rear frame without contacting the rear frame.

16. The planar light source device according to claim 12, wherein an inner surface of the mold frame faces the side surface of the light guide plate.

17. The planar light source device according to claim 16, wherein the inner surface of the mold frame contacts the side surface of the light guide plate to regulate a position of the light guide plate.

18. The planar light source device according to claim 12, further comprising a reflective sheet disposed over the rear frame and reflecting the light emitted from the back surface of the light guide plate.

19. A display device, comprising:
the planar light source device according to claim 12; and
a display panel opposing the planar light source device.

* * * * *